United States Patent [19]

Humlong

[11] 3,722,930
[45] Mar. 27, 1973

[54] BICYCLE HANDLEBAR STEM

[75] Inventor: Robert F. Humlong, Maysville, Ky.

[73] Assignee: Wald Manufacturing Company, Incorporated, Maysville, Ky.

[22] Filed: Sept. 3, 1971

[21] Appl. No.: 177,650

[52] U.S. Cl..............287/54 E, 287/52.02, 74/551.6
[51] Int. Cl................................................F16b 7/18
[58] Field of Search..............74/551.3, 551.1, 551.6; 287/54.1, 52.02, 54 E

[56] References Cited

UNITED STATES PATENTS 3,361,455  1/1968  Hussey et al....................74/551.6 X

FOREIGN PATENTS OR APPLICATIONS 1,352,718  1/1964  France.........................287/54 E
568,501   12/1923  France.........................287/54.1
610,136    5/1926  France.........................287/54 E Primary Examiner—Andrew V. Kundrat
Attorney—J. Warren Kinney, Jr.

[57] ABSTRACT

The handlebar stem, constructed inexpensively of formed sheet metal parts, requires but a single bolt for simultaneously clamping the handlebar ferrule, fixing the stem head upon the stem, expanding the stem within the fork bearing tube, and effecting at the same time powerful friction bites between the head, the stem, and said ferrule, to fix said parts securely against relative displacement incident to tightening the stem bolt.

10 Claims, 6 Drawing Figures

Patented March 27, 1973
3,722,930
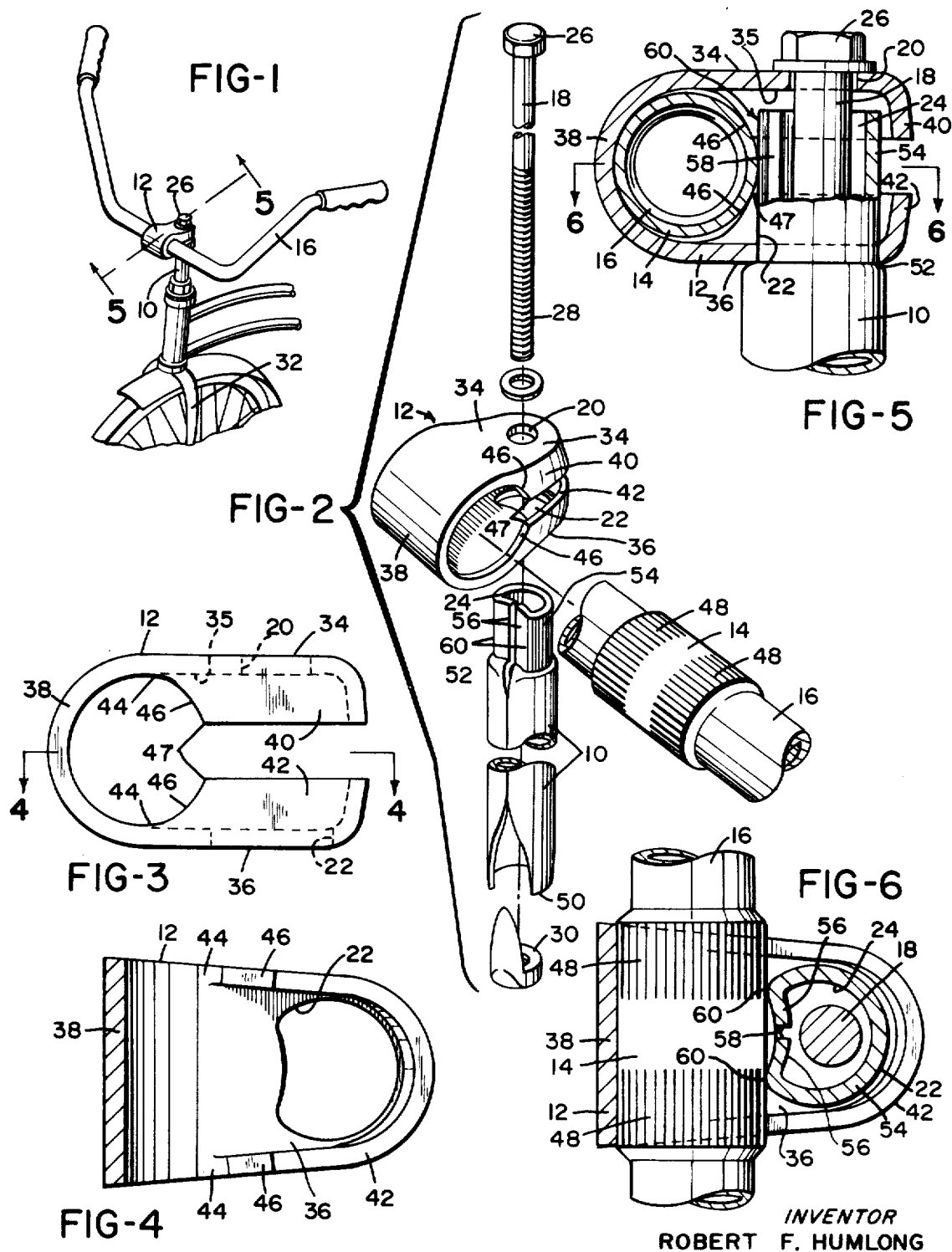
INVENTOR
ROBERT F. HUMLONG
BY J. Warren Kinney Jr.
ATTORNEY 3,722,930

BICYCLE HANDLEBAR STEM

BACKGROUND OF THE INVENTION

The steering apparatus of the bicycle has for many years included a handlebar stem having a head thereon adapted for clamping engagement about the handlebar ferrule to fix the stance of the handlebar. The clamp head usually was in the form of a split sleeve contractable about the ferrule by means of a clamp screw other than the stem bolt which adjustably fixed the stem within the confines of the front fork bearing tube.

Formerly, the clamp head was integral with the stem, however, in more recent practice, the clamp head has been shaped from heavy sheet metal as a split sleeve either fixed to or loosely fitted onto the upper end of a tubular stem, the head being secured by a single stem bolt having a threaded end threadedly engaging a wedge-shaped nut which, incident to tightening of the bolt, was displaced laterally within the fork bearing tube to fix the stem against rotation within the tube.

The steering gear of the prior art as last mentioned above, while embodying the desirability of a single stem bolt, lacked sufficient clamping force amongst the constituent parts to preclude eventual loosening and relative displacement of the parts. Such inadequacy of clamping force occurring in the steering gear greatly impaired the safety factor and exposed the cyclist to serious threat of accident in the operation of his vehicle.

SUMMARY OF THE INVENTION

In accordance with the present invention, the constituent parts of the single-bolt stem are so constructed as to establish cooperative areas and points of intense frictional bite between the several parts, all occurring incident to tightening of the single stem bolt. More specifically stated, a tightening of the single stem bolt establishes powerful frictional bites between the stem and the head, between the head and the handlebar ferrule, and between the ferrule and the stem; the latter connection being such as to provide positive insurance against rotation of the head relative to the stem.

The intense frictional clamping forces inherent in the improved construction result, in part at least, from an ingenious proportioning of the constituents, and the provision of durable sharp edges capable of effecting strong frictional bites in critical areas where relative movement of the parts have a tendency to occur. The simple operation of tightening the single stem bolt, brings into firm and secure engagement all of the critical bite areas. At the same time, a wedge element at the lower end of the stem expands the stem forcefully within the bearing tube of the steering fork, to lock the stem against rotation relative to the fork.

BRIEF DESCRIPTION OF THE DRAWING

FIG. 1 is a fragmentary perspective view of a bicycle embodying a steering post of the present invention.

FIG. 2 is an exploded perspective view of a steering post of the present invention.

FIG. 3 is a side elevational view of the head of the steering post of FIG. 2.

FIG. 4 is a cross-section taken on line 4—4 of FIG. 3.

FIG. 5 is an enlarged cross-section taken on line 5—5 of FIG. 1.

FIG. 6 is a cross-section taken on line 6—6 of FIG. 5.

DESCRIPTION OF THE PREFERRED EMBODIMENT

In the drawing, the handlebar steering post or stem is denoted by the numeral 10, and is adapted to support a head 12 in which is accommodated for clamping, the cylindrical mounting ferrule 14 of a handlebar 16. A long stem bolt 18 is adapted to pass through a top opening 20 and a bottom opening 22 of the head, as well as through the axial passageway 24 of the hollow stem. The stem bolt has at one end a wrench head 26, and at the opposite end portion a screw thread 28.

The threaded end of the bolt is adapted to engage the internal threads of a conventional wedge nut 30, the function of which is to exert radial force to wedge the lower end of the stem within the cylindrical upper bearing tube (not shown) of a conventional steering fork 32, incident to tightening of the bolt, which results in locking the stem against rotation within the fork bearing tube in accordance with common practice.

The stem head 12 is in the form of a C formed of heavy gauge sheet metal, and comprising an upper leg 34 and a lower leg 36 spaced from one another, and connected by means of a semi-cylindrical body portion or loop portion 38. The loop portion 38 is characterized by limited bendability and resiliency, so that the legs 34 and 36 are capable of relative movement for altering the diameter of portion 38.

The upper and lower legs 34 and 36 are substantially flat and coplanar around their respective openings 20 and 22; the outer periphery of each leg terminates in flanges 40 and 42, respectively, which project toward one another according to FIGS. 3 and 5 and substantially reinforce their respective leg portions. The flanges extend toward the loop portion 38, and terminate in arcuate jaw portions 46, 46 which terminate at the inner surface of loop 38 as at 44, see FIGS. 3 and 4. Adjacent to the terminii 44, 44, each flange has an arcuate jaw portion 46, 46 providing rigid abutment edges 47, 47 adapted to bite into the metal of ferrule 14 when legs 34 and 36 are contracted thereon according to FIG. 5. The ferrule may be knurled or roughened as at 48 to enchance the grip with jaws 46.

The stem 10 is formed as a substantially cylindrical tube from heavy gauge sheet metal. At the lower end, the stem is shaped or formed as at 50 to accommodate a conventional expansion or wedge nut, as previously explained. At the upper end, the stem is formed to provide a circumferential shoulder or seat 52 and a diametrally reduced short neck 54.

Neck 54 in transverse cross-section is of substantial D-shaped, (FIGS. 2 and 6), with the upright strut of the D formed by opposite edge margins of the metal shape. The neck accordingly has two wings 56, 56 turned toward one another, with meeting or closely spaced edges 58, 58 displaced toward the longitudinal axis of stem 10, FIG. 6.

The aforesaid displacement of edges 58, 58 of wings 56, 56, results in a substantially coplanar disposition of the wings with one another, (FIG. 6); but wherein the wings are further displaced to provide pressure humps as at 60, 60 adapted for point-contact abutment with the roughened surfaces of ferrule 14. The point-contact abutments at 60, 60 make strong frictional engagement with the ferrule knurls when the legs 34, 36 of the head are contracted incident to tightening the stem bolt. Tightening of the stem bolt causes loop 38 to force ferrule 14 into firm contact with the pressure humps at 60, 60, thereby to not only establish an intense bite or frictional engagement precluding rotation of the ferrule within loop 38, but additionally to preclude rotation of stem 10 about its own axis.

It may here be noted that tightening of the stem bolt 18 in nut 30 results in producing an intense friction bite between the abutment edges 47, 47 of the flange jaws 46, 46 and the knurls of the handlebar ferrule 14, as best illustrated in FIG. 5. The bite of course increases in intensity as the head legs are displaced toward one another incident to tightening of the stem bolt, so that rotation of the handlebar ferrule within the head 12 is effectively precluded by the jaws 46, 46 as well as by the action of the pressure humps 60, 60.

The opening 22 in head leg 36, is shaped complementarily to the D-shape of the stem neck 54, and is substantially aligned with upper opening 20. The stem neck 54 fits slidingly or snugly into the D opening 22, so that the neck may not be rotated therein. The upper end of the stem neck is spaced always from the underface 35 of head leg 34, as in FIG. 5, so as to afford no interference with contraction of the legs by the stem bolt. The leg 36 rests firmly upon stem shoulder 52 at the base of the stem neck 54.

Applying the head 12 loosely upon the neck of stem 10 as previously suggested, will of course simplify and expedite assembly of the steering gear. It will also make possible an easy substitution of one head for another when the heads are made available in different forms or with various decorative or identity features incorporated therein.

As clearly illustrated in FIGS. 5 and 6, ferrule 14 of the handlebar is subjected to a positive three-point contact with the head and D-shaped portion of the barrel. It will be noted that when the loop-portion 38 of the head contacts the ferrule, the opposite side of the ferrule is forced into locking engagement with abutment edges 47, 47 of the arcuate jaw portion 46, and at the same time the intermediate portions of the ferrule opposite loop 38 are forced against each of the pressure humps 60, 60 of the D-shaped neck portion 54 of barrel 10 thereby providing a relationship which will positively preclude and eliminate any possibility of ferrule 14 rocking within the head.

From the foregoing it will be noted that the subject invention provides simple, yet highly effective, means for positively securing a handlebar relative to the steering post assembly, by means of a single bolt.

What is claimed is:

1. A bicycle steering post for attachment to a steering-fork bearing tube, and comprising in combination: an elongate tubular stem having upper and lower ends; the upper end including an integral upstanding neck having a pair of wings turned toward one another and depressed inwardly toward the stem axis to form a substantially D cross-sectional transverse configuration; an elongate stem bolt having a headed end and a threaded end, said bolt being receptive lengthwise within the tubular stem, with the threaded end projecting from the lower end of the stem; a contractable head comprising upper and lower substantially parallel legs and a part-cylindrical loop portion connecting said legs, said legs having aligned apertures formed therein; the aperture of the lower leg being complementarily shaped to receive said D-shaped neck; said loop portion being snugly receptive of the cylindrical mounting ferrule of a bicycle handle bar; said bolt passing through the aligned apertures of the legs, and axially through said tubular stem, with the headed end of the bolt disposed atop said upper leg; means for limiting movement of the head along the stem in the direction of the lower end of the stem; and means under the control of said stem bolt, for adjustably fixing said stem relative to the steering fork bearing tube, and for contracting said head loop portion firmly about the handlebar ferrule, to secure said ferrule in said loop portion of the head.

2. The combination as specified by claim 1, wherein the wings aforesaid meet the neck each along a pressure hump which extends longitudinally of the stem axis, the apertures of the legs being so spaced from the axis of the head loop, that said humps have a direct bearing upon the inserted ferrule when the legs are drawn toward one another by the clamping action of the stem bolt against the upper leg of the head.

3. The combination as specified by claim 2, wherein said means for limiting movement of the head along the stem, comprises a shoulder at the base of the neck providing a seat to abut the lower leg marginally of the lower leg aperture.

4. The combination as specified by claim 1, wherein is included a flange on each leg of the head, said flanges being turned toward one another, and each flange including a jaw to bite the ferrule of the handlebar during contraction of the loop portion of the head incident to tightening of the stem bolt.

5. The combination as specified by claim 2, wherein is included a flange on each leg providing a pair of jaws, said jaws being gauged to bite the ferrule of the handlebar approximately simultaneously with imposition of force upon the ferrule by said pressure humps.

6. The combination as specified by claim 1, wherein is included: a pair of contact abutments on the stem, and a pair of jaws on a leg of the head, said abutments and said jaws being located and coordinated to bite the ferrule substantially simultaneously with tightening of the stem bolt and resultant fixing of said stem relative to the steering fork bearing tube.

7. The combination as specified by claim 6, wherein said contact abutments upon the stem are point-contacts which are spaced apart to bite the ferrule at opposite sides of a middle point of the ferrule, with resultant fixation of the stem against rotation relative to the ferrule.

8. The combination as specified by claim 1, wherein said wings are formed to provide each a contact abutment to engage the ferrule; and a pair of jaws on a leg of the head, said abutments and said jaws being located and coordinated to bite the ferrule substantially simultaneously with tightening of the stem bolt to fix the stem relative to the steering fork bearing tube.

9. The combination as specified by claim 8, wherein said means for limiting movement of the head along the stem, comprises a shoulder on the stem providing a seat to abut the lower leg marginally of the lower leg aperture.

10. The combination as specified by claim 8, wherein said means for limiting movement of the head along the stem, comprises a weld-like connection rigidly joining the stem to the lower leg of the head.

* * * * *